(12) United States Patent
Walter et al.

(10) Patent No.: US 7,102,331 B2
(45) Date of Patent: Sep. 5, 2006

(54) GENERATOR WITH DUAL CYCLOCONVERTER FOR 120/240 VAC OPERATION

(75) Inventors: Richard T. Walter, Baldwin, MD (US); Michael K. Forster, White Hall, MD (US)

(73) Assignee: Black & Decker Inc., Newark, DE (US)

( * ) Notice: Subject to any disclaimer, the term of this patent is extended or adjusted under 35 U.S.C. 154(b) by 114 days.

(21) Appl. No.: 10/758,609

(22) Filed: Jan. 15, 2004

(65) Prior Publication Data

US 2004/0164716 A1    Aug. 26, 2004

Related U.S. Application Data

(60) Provisional application No. 60/440,959, filed on Jan. 17, 2003.

(51) Int. Cl.
*H02J 1/00* (2006.01)
*H02J 7/14* (2006.01)
*H02J 7/24* (2006.01)
*H02J 7/00* (2006.01)

(52) U.S. Cl. .......................................... 322/8; 320/123
(58) Field of Classification Search .................... 322/8, 322/123
See application file for complete search history.

(56) References Cited

U.S. PATENT DOCUMENTS

| | | | |
|---|---|---|---|
| 2,377,930 A * | 6/1945 | Fuller | 322/59 |
| 3,668,419 A * | 6/1972 | Cherry et al. | 307/66 |
| 3,793,544 A * | 2/1974 | Baumgartner et al. | 320/123 |
| 3,982,168 A | 9/1976 | Bose et al. | 363/173 |
| 4,045,718 A * | 8/1977 | Gray | 320/123 |
| 4,047,088 A * | 9/1977 | Himmler | 320/123 |

(Continued)

FOREIGN PATENT DOCUMENTS

DE    295 01 707.4 U1    6/1995

(Continued)

*Primary Examiner*—Darren Schuberg
*Assistant Examiner*—Pedro J. Cuevas
(74) *Attorney, Agent, or Firm*—Harness, Dickey & Pierce, P.L.C.

(57) ABSTRACT

A generator system in accordance with the invention has two modes of operation, such as 120 VAC and 240/120 VAC modes of operation. The generator system has a permanent magnet generator with two independent sets of windings that each generate a three phase AC voltage. One three phase AC voltage is coupled to a first or master cycloconverter and the second three phase AC voltage is coupled to a second or slave cycloconverter. Live outputs of each cycloconverter are coupled to each other through a switch, such as a relay and neutral outputs of each cycloconverter are coupled to ground. A controller controls the cycloconverters to provide a first voltage, illustratively 120 VAC, across their respective outputs having the same amplitude. When in the 120 VAC mode, the switch across the live outputs of the first and second cycloconverters is closed, shorting the live outputs of the first and second cycloconverters together and the controller operates the first and second cycloconverters so their output voltages are in phase with each other. When in the 240/120 VAC mode, the switch across the live outputs of the first and second cycloconverters is open and the controller operates the first and second cycloconverters so that their output voltages are 180 degrees out of phase. The permanent magnet generator has rotor position sensors that are used by a brushless DC motor drive to drive the permanent magnet generator as a brushless DC motor to start the engine of the generator system and also to develop cosine wave information for use in controlling the cycloconverters.

95 Claims, 8 Drawing Sheets

U.S. PATENT DOCUMENTS

| | | | | |
|---|---|---|---|---|
| 4,100,474 A | * | 7/1978 | Pfeffer et al. | 320/123 |
| 4,114,082 A | * | 9/1978 | Scheidler | 320/117 |
| 4,117,390 A | * | 9/1978 | Iwata et al. | 322/90 |
| 4,122,354 A | | 10/1978 | Howland | 290/31 |
| 4,153,869 A | * | 5/1979 | Ragaly | 322/90 |
| 4,174,534 A | | 11/1979 | Kotlarewsky | 363/26 |
| 4,210,856 A | * | 7/1980 | Taylor | 320/123 |
| 4,492,912 A | * | 1/1985 | Nowakowski | 320/123 |
| 4,496,897 A | * | 1/1985 | Unnewehr et al. | 322/25 |
| 4,516,066 A | * | 5/1985 | Nowakowski | 320/123 |
| 4,604,528 A | * | 8/1986 | Norton | 307/9.1 |
| 4,672,294 A | * | 6/1987 | Norton | 320/123 |
| 4,686,442 A | * | 8/1987 | Radomski | 320/123 |
| 4,692,684 A | * | 9/1987 | Schaeffer | 322/90 |
| 4,694,238 A | * | 9/1987 | Norton | 322/28 |
| 4,723,079 A | * | 2/1988 | Norton | 307/66 |
| 4,723,105 A | * | 2/1988 | Matouka et al. | 320/123 |
| 4,743,830 A | * | 5/1988 | Lakey | 320/104 |
| 4,748,395 A | * | 5/1988 | Reynolds | 320/123 |
| 4,808,842 A | * | 2/1989 | Hughes | 307/43 |
| 4,816,736 A | * | 3/1989 | Dougherty et al. | 320/116 |
| 4,830,412 A | | 5/1989 | Raad et al. | 290/31 |
| 5,065,086 A | | 11/1991 | Takakado | 322/10 |
| 5,097,165 A | * | 3/1992 | Mashino et al. | 310/112 |
| 5,132,604 A | | 7/1992 | Shimane et al. | 322/10 |
| 5,159,539 A | * | 10/1992 | Koyama | 363/8 |
| 5,166,538 A | * | 11/1992 | Norton | 307/10.1 |
| 5,189,603 A | | 2/1993 | Sashida et al. | 363/160 |
| 5,212,952 A | | 5/1993 | Yokoyama et al. | 60/721 |
| 5,245,267 A | * | 9/1993 | Pierret et al. | 320/119 |
| 5,355,300 A | | 10/1994 | Zinn | 363/146 |
| 5,416,401 A | * | 5/1995 | Neuhaus | 320/125 |
| 5,512,811 A | * | 4/1996 | Latos et al. | 322/10 |
| 5,689,174 A | | 11/1997 | Pacheco, Sr. | 322/16 |
| 5,714,821 A | * | 2/1998 | Dittman | 310/179 |
| 5,747,971 A | * | 5/1998 | Rozman et al. | 322/10 |
| 5,751,070 A | | 5/1998 | Nagao et al. | 290/46 |
| 5,784,267 A | | 7/1998 | Koenig et al. | 363/43 |
| 5,920,162 A | * | 7/1999 | Hanson et al. | 318/254 |
| 5,969,957 A | * | 10/1999 | Divan et al. | 363/36 |
| 5,998,976 A | | 12/1999 | Steffan | 322/10 |
| 6,008,545 A | | 12/1999 | Nagano et al. | 290/46 |
| 6,166,455 A | | 12/2000 | Li | 307/43 |
| 6,202,776 B1 | | 3/2001 | Masberg et al. | 180/65.2 |
| 6,265,786 B1 | | 7/2001 | Bosley et al. | 290/52 |
| 6,281,664 B1 | * | 8/2001 | Nakamura et al. | 322/22 |
| 6,323,608 B1 | * | 11/2001 | Ozawa | 318/139 |
| 6,326,308 B1 | * | 12/2001 | Tani | 438/689 |
| 6,441,643 B1 | * | 8/2002 | Chan et al. | 326/81 |
| 6,455,951 B1 | * | 9/2002 | Shultz et al. | 307/10.1 |
| 6,507,506 B1 | * | 1/2003 | Pinas as et al. | 363/79 |
| 6,608,401 B1 | * | 8/2003 | Walter | 307/39 |
| 6,665,158 B1 | * | 12/2003 | Walter | 361/18 |
| 6,879,057 B1 | * | 4/2005 | Pinas et al. | 307/10.1 |
| 6,894,404 B1 | * | 5/2005 | Ertzsaenger et al. | 307/10.1 |
| 6,909,201 B1 | * | 6/2005 | Murty et al. | 307/10.1 |
| 6,924,621 B1 | * | 8/2005 | Jabaji et al. | 320/123 |
| 6,927,985 B1 | * | 8/2005 | Klinkowstein | 363/17 |

FOREIGN PATENT DOCUMENTS

| | | |
|---|---|---|
| DE | 298 21 825 U1 | 12/1998 |
| EP | 0 488 108 A1 | 6/1992 |
| EP | 1 138 935 A2 | 10/2001 |
| JP | 61-177167 | 8/1986 |
| JP | 64-050763 | 2/1989 |
| JP | 05-153780 | 6/1993 |
| JP | 05-292746 | 11/1993 |
| JP | 10-108463 | 4/1998 |

* cited by examiner

GENERATOR WITH DUAL CYCLOCONVERTER FOR 120/240 VAC OPERATION

CROSS-REFERENCE TO RELATED APPLICATIONS

This application claims the benefit of U.S. Provisional Application No. 60/440,959, filed on Jan. 17, 2003.

FIELD OF THE INVENTION

The present invention relates to portable generators, and more particularly, a portable generator using cycloconverters that has a 120 VAC mode of operation and a 240/120 VAC mode of operation.

BACKGROUND OF THE INVENTION

Present day portable generators typically make use of a synchronous alternator or cycloconverter for providing the desired power output, which is typically 120 VAC or 240 VAC. Important considerations for any portable generator are:
  Voltage regulation;
  Dual voltage output capability;
  Idle voltage and frequency;
  Frequency tolerance;
  Harmonic distortion:
    Induction motor operation
    Charger operation
  Grounding configuration;
  4-blade (120–240 volt) twist-lock compatibility;
  Response to load changes; and
  Size and weight.

With regard to idle voltage and frequency, it is far easier to provide 120 volts and 60 Hz at idle using electronic solutions (i.e., inverter technology) than it is with synchronous alternators. However, sufficient voltage "head room" is still required. This higher voltage requires more turns in the alternator coils resulting in an increased coil resistance and reduced system efficiency.

Harmonic distortion present in the output waveform of a portable generator is another important consideration that must be addressed. While waveform purity is of little importance to constant speed universal motor-powered portable power tools, it is an important consideration when running induction motors and chargers. Induction motors will run on distorted waveforms, but the harmonic content of the input will be converted to heat, not torque. The extra heating from the harmonics must be quantified if a inverter topology which produces a distorted waveform is to be implemented. A sine wave pulse width modulated (PWM) inverter will produce excellent waveforms with only some high frequency noise, but they are likely to require full H-bridges which, traditionally, have not been easily adaptable to the North American grounding convention and the 4-blade twist-lock wiring convention.

With regard to grounding configurations, in North America, the standard grounding convention requires that one side (neutral) of each 120 volt circuit is grounded. This means that 240 volt circuits have floating grounds.

Still another important consideration is 4-blade (120–240 volt) twist lock compatibility. This convention requires four wires: ground, neutral, 120 volt line 1 and 120 volt line 2. Each 120 volt circuit is connected between a 120 volt line and neutral. The 240 volt circuit is connected between the 120 volt line 1 and the 120 volt line 2.

The ability of a generator to respond to load changes is still another important consideration. All inverter topologies will provide a faster response to load changes than a synchronous alternator, due to the large field inductance used by a synchronous alternator.

Concerning size and weight, it would also be desirable to make use of inverter topology because virtually any inverter topology will provide size and weight benefits over that of a synchronous alternator. However, trying to produce sine waves from a two half bridge circuit may require large capacitors that would reduce the benefit of volume reduction provided by the inverter topology.

Cycloconverters have been used in generator systems to convert the AC voltage generated by the generator to the desired AC output voltage. Electrical systems using cycloconverters typically have an AC voltage source to the cycloconverters that is fairly stiff (low source impedance). Consequently, the AC phasing information for commutation of the SCRs of the cycloconverters can be directly derived from the 3-phase AC voltages provided to the cycloconverters. Suitable filtering is necessary to remove the commutation notches introduced by SCR switching/commutation. However, permanent magnet generators provide a very soft AC source in that they have significant series reactance. This presents two problems for control of the SCRs of the cycloconverter in a generator systems using a permanent magnet generator. First, the AC voltage waveforms are significantly disturbed by the switching of the SCRs of the cycloconverter and thus would require significant filtering. Second, the reactance of the permanent magnet generator introduces a significant phase shift between the back-emf voltage waveforms of the permanent magnet generator (which cannot be measured) and the AC voltages at the outputs of the permanent magnet generator (terminal voltages), especially as the generator system is loaded. This load dependent phase shift can't be eliminated by a simple filter.

Generators having two isolated 120 VAC outputs that can be switched between 120 VAC parallel connection mode (120 VAC mode) to a 240 VAC series connection mode (240/120 VAC mode) would typically use a multi-pole switch, as shown in FIG. 10. With reference to FIG. 10, generator system 1000 is shown as having two isolated 120 VAC sources 1002, 1004, which could be cycloconverters such as cycloconverters 42, 44 described below. Generator system 1000 also has a 120 VAC output, shown illustratively as resistance 1006, a 240 VAC output, shown illustratively as resistance 1008, and a switch 1010 that switches generator system 1000 between the 120 VAC parallel connected mode where sources 1002 and 1004 are connected in parallel and the 240 VAC series connected mode where sources 1002 and 1004 are connected in series.

Positive output 1014 of 120 VAC source 1004 is connected to ground and to one side of 120 VAC output 1006. Negative output 1018 of 120 VAC source 1004 is coupled to the other side of 120 VAC output 1006 and to one side of 240 VAC output 1008. Switch 1010 switches positive output 1012 of 120 VAC source 1002 and negative output 1016 of 120 VAC source 1002 to switch 120 VAC sources 1002, 1004 between the 120 VAC parallel connected mode and the 240/120 VAC series connected mode as described below.

Switch 1010 is a multi-pole switch, such as a double pole relay, as shown in FIG. 10. When in the parallel connected 120 VAC mode, positive output 1012 of 120 VAC source 1002 is connected to positive output 1014 of 120 VAC source 1004, and thus to ground, by switch 1010 and negative outputs 1016, 1018 of sources 1002, 1004, respectively are connected together by switch 1010. 120 VAC is provided at 120 VAC output 1006 by the parallel connected 120 VAC sources 1002, 1004.

In the 240 VAC series connected mode, positive output 1012 of 120 VAC source 1002 is connected through switch 1010 to the other side of 240 VAC output 1008, with the first side of 240 VAC output 1008 connected to the negative output 1018 of 120 VAC source 1004 as described above. The negative output 1016 of 120 VAC source 1002 is connected through switch 1010 to ground. 120 VAC is provided at 120 VAC output 1006 by 120 VAC source 1004 and 240 VAC is provided at 240 VAC output 1008 by the series connected 120 VAC sources 1002, 1004.

SUMMARY OF THE INVENTION

A generator system in accordance with the invention has at least two modes of operation where a first output voltage is provided in the first mode and the first output voltage and a second output voltage is provided in the second mode. The second output voltage is twice the first output voltage. In an embodiment, the first output voltage is nominally 120 VAC and the second output voltage is nominally 240 VAC. The generator system has a permanent magnet generator with two independent sets of windings that each generate a three phase AC voltage. One three phase AC voltage is coupled to a first or master cycloconverter and the second three phase AC voltage is coupled to a second or slave cycloconverter. Live outputs of the cycloconverters are coupled to each other through a switch, such as a relay, and neutral outputs of the cycloconverters are coupled to ground. A controller controls the cycloconverters to provide the first output voltage, illustratively 120 VAC, across their respective live and neutral outputs. When in the first mode, such as the 120 VAC mode, the switch across the live outputs of the first and second cycloconverters is closed, shorting the live outputs of the first and second cycloconverters together and the controller operates the first and second cycloconverters so that their output voltages are in-phase with each other. When in the second mode, such as the 240/120 VAC mode, the switch across the live outputs of the first and second cycloconverters is open and the controller operates the first and second cycloconverters so that their output voltages are 180 degrees out of phase. This provides the first output voltage, illustratively 120 VAC, across the live and neutral outputs of each of the first and second cycloconverters and the second output voltage that is twice the first output voltage, illustratively 240 VAC, across the live outputs of the first and second cycloconverters. In an aspect of the invention, the switch is a single-pole switch such as a single pole relay.

In an aspect of the invention, the cycloconverters are phase-controlled by the controller and naturally commutated.

In an aspect of the invention, the permanent magnet generator has rotor position sensors that sense the position of a rotor of the permanent magnet generator as it rotates. Outputs of these rotor position sensors are input to the controller which uses them to generate control wave information that it uses to control the cycloconverters, illustratively cosine control waves In an aspect of the invention, the cycloconverters have a positive bank and a negative bank of naturally commutated switching devices such as silicon controlled rectifiers (SCRs). In an aspect of the invention, each SCR includes an SCR/opto-SCR combination having an SCR and an opto-SCR where the opto-SCR is coupled to a gate of the SCR and used to trigger or control the SCR.

In an aspect of the invention, voltages across the SCRs of the positive and negative bank of each of the cycloconverters are sensed and used to determine when the respective cycloconverter bank is in a zero current condition.

In an aspect of the invention, changeover from a positive to a negative bank of a cycloconverter is initiated by a bandpass filter of instantaneous current of the cycloconverter, changeover being initiated when the bandpass filtered instantaneous current transitions about zero, such as by falling within a predetermined range about zero.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
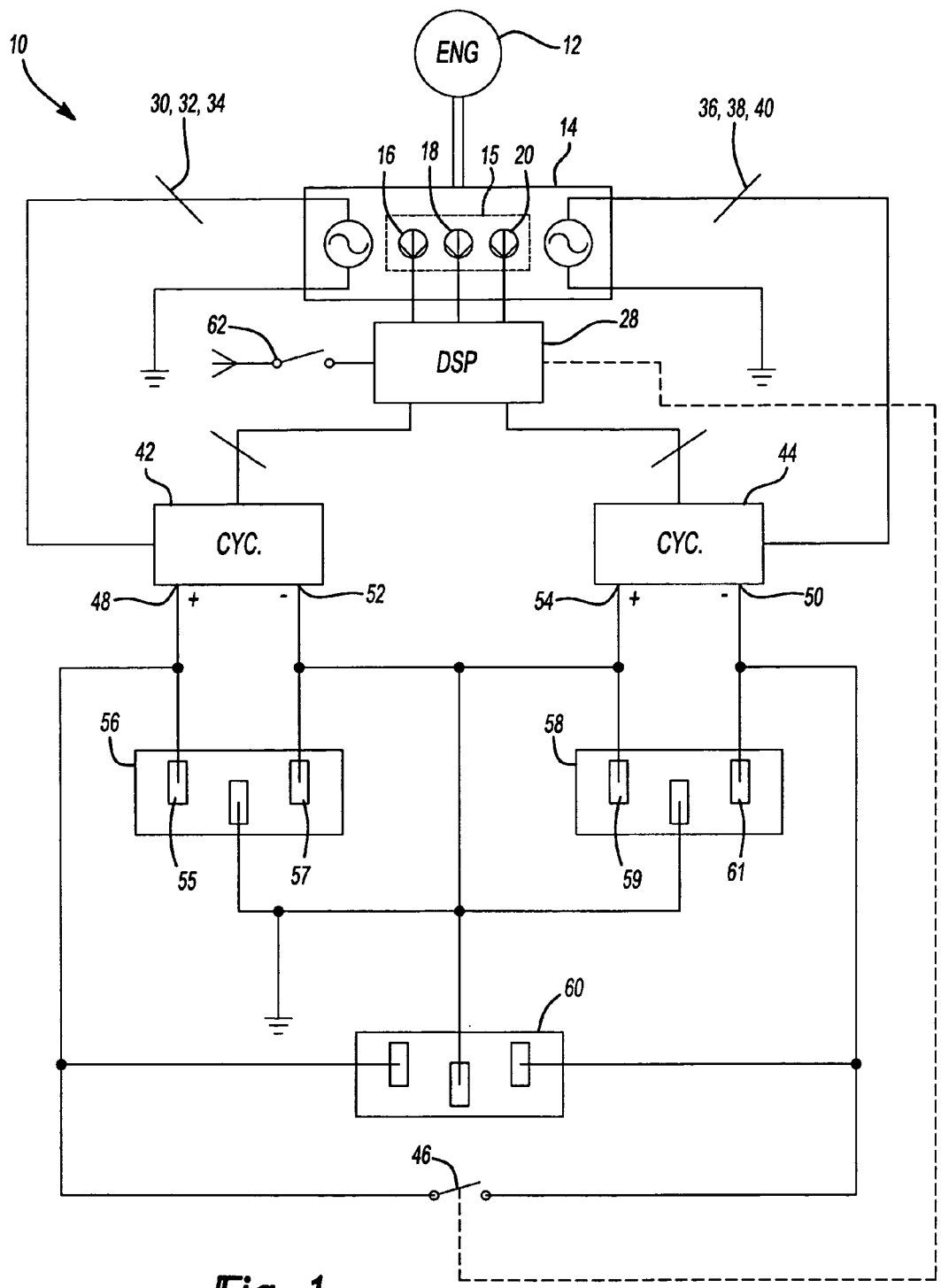
FIG. 1 is simplified schematic of a generator system in accordance with the invention.

Referring to FIG. 1, a generator system 10, switchable between first and second modes of operation is shown schematically. In the first mode, the generator system 10 produces a first output voltage and in the second mode, the generator system 10 produces two output voltages, the first output voltage and a second output voltage that is twice the first output voltage. In an embodiment, the first output voltage is nominally 120 VAC and the second output voltage is 240 VAC and the first mode is then alternatively referred to as the 120 VAC mode and the second mode is alternatively referred to as the 240/120 VAC mode. In this embodiment, the first output voltage is referred to as being nominally 120 VAC to mean that it is the standard AC voltage used in the United States for light appliances and devices, such as lamps, power tools, etc. The reference to the second output voltage as being nominally 240 VAC is so that it is twice the nominal first output voltage of 120 VAC.

Figure 2:
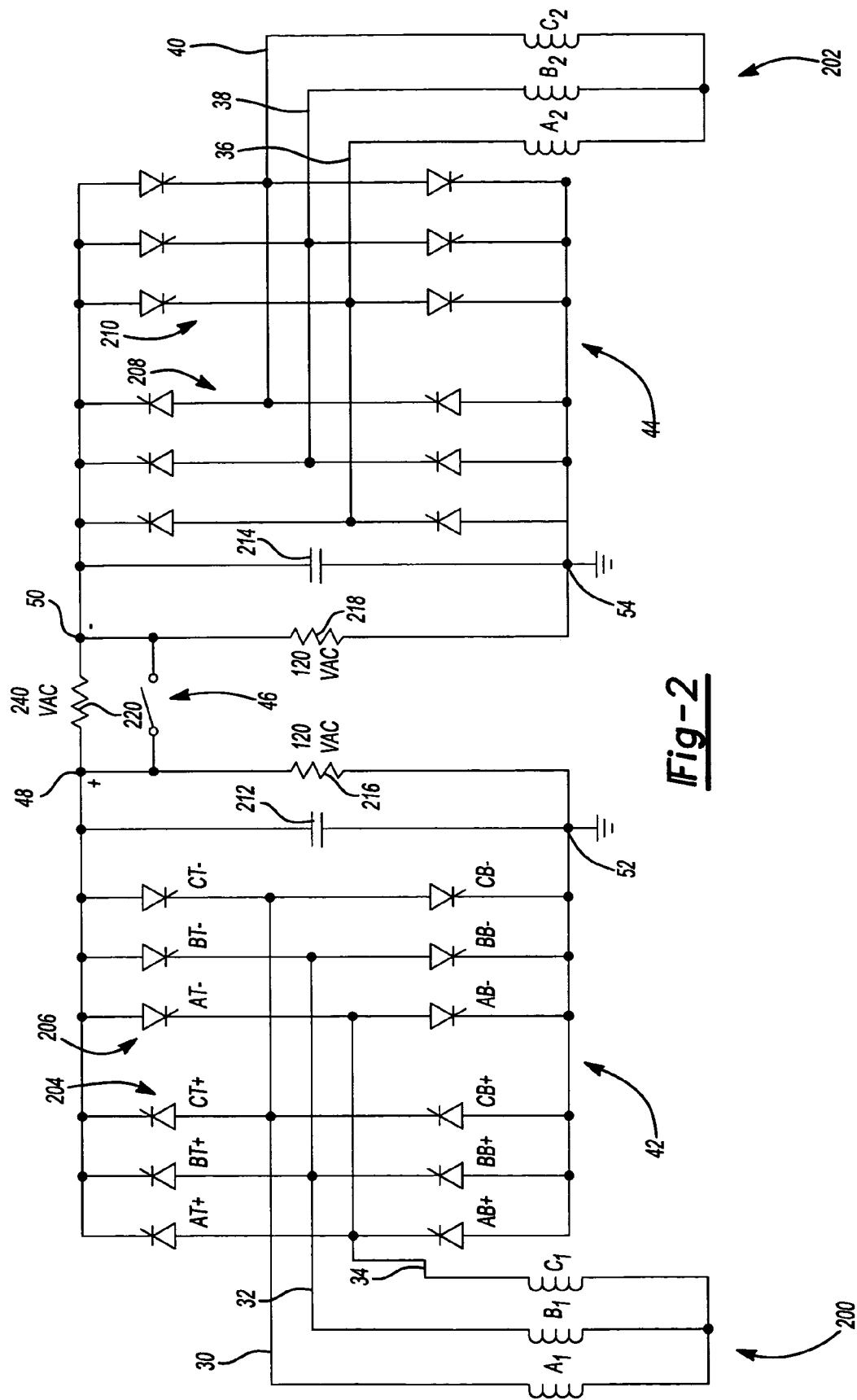
FIG. 2 is a simplified power system diagram of the generator system of FIG. 1.

Generator 10 has an engine 12, illustratively an internal combustion engine, that drives a generator 14, which is illustratively a permanent magnet generator and which will be referred to herein as permanent magnet generator 14. Permanent magnet generator 14 has a rotor 15 with permanent magnets and a stator with two independent/isolated sets of three-phase windings 200, 202 (FIG. 2). Permanent magnet generator 14 also includes rotor position sensors 16, 18, 20, illustratively hall effect transducers, that sense the position of a rotor (not shown) of permanent magnet generator every 120 degrees electrical. The hall effect transducers are illustratively the hall effect transducers provided as part of permanent magnet generator 14 to enable it to be driven as a brushless DC motor to start engine 12, as described below and as described in Starter System for Portable Internal Combustion Engine Electric Generators Using a Portable Universal Battery Pack, U.S. Ser. No. 60/386,904, filed Jun. 6, 2002 (now, U.S. Ser. No. 10/453,988 filed Jun. 4, 2003), the disclosure of which is incorporated herein in its entirety by reference. Outputs of the rotor position sensors 16, 18, 20 are coupled to inputs of a controller, such as a digital signal processor (DSP) 28.

Permanent magnet generator 14 generates two separate three-phase voltages at first set of outputs 30, 32, 34 and second set of outputs 36, 38, 40. The outputs 30, 32, 34 at which the first three phase voltage is generated are coupled to a first (Master) AC power converter 42 and the second set of outputs 36, 38, 40 are coupled to a second (Slave) AC power converter 44. In an embodiment of the invention, AC power converters 42 and 44 are cycloconverters and will be referred to herein as cycloconverters. Each cycloconverter 42, 44 is controlled by DSP 28 to convert the respective three phase voltage coupled to it to an independent and isolated 120 VAC 60 Hz voltage at their respective outlets 56, 58. It should be understood that a controller other than a digital signal processor can be used, such as a microcontroller. It should also be understood that permanent magnet generator 14, DSP 28 and cycloconverters 42, 44 can be configured to produce other voltages and frequencies, 115 VAC or 50 Hz for example, for markets outside the U.S., without significant hardware changes. Cycloconverters 42, 44 and their control by DSP 28 will be described in more detail below. Also, in an embodiment, a DSP 28 is provided for each of cycloconverters 42, 44.

A switch 46, illustratively a single-pole relay, is coupled across a live output 48 of first cycloconverter 42 and a live output 50 of cycloconverter 44. Neutral outputs 52, 54 of first and second cycloconverters 42, 44, respectively, are coupled to ground. Live output 48 of first cycloconverter 42 is coupled to a live output 55 of outlet 56 and a neutral output 52 of first cycloconverter 42 is coupled to a neutral output 57 of outlet 56. Live output 54 of second cycloconverter 44 is coupled to a live output 59 of outlet 58 and neutral output 50 of second cycloconverter 44 is coupled to a neutral output 61 of outlet 58.

This configuration provides for two modes of operation for generator system 10, 120 VAC and 240/120 VAC in an embodiment of the invention. In the 120 VAC mode, switch 46 is closed, paralleling the live outputs 48, 50 of first and second cycloconverters 42, 44, providing increased current output at outlets 56, 58 of generator system 10 compared to the 240/120 VAC mode. In the 240/120 VAC mode, first and second cycloconverters 42, 44 are controlled by DSP 28 so that the voltages output by the cycloconverters 42, 44 across their respective live outputs 48, 50 to respective neutral outputs 52, 54 are 180 degrees out of phase with each other to enable single point series connection for 240 VAC operation. This provides 240 VAC at outlet 60 of generator system 10 and 120 VAC at each of outlets 56, 58. In the 120 VAC mode, first and second cycloconverters 42, 44 are controlled by DSP 28 so that the voltages output by the cycloconverters 42, 44 are in-phase with each other. Having the voltages output by first and second cycloconverters 42, 44 in-phase with each other ensures that no circulating current flows between first and second cycloconverters 42, 44 and thus allows load sharing between them provided that the output voltages of each of first and second cycloconverters 42, 44 have the same amplitude. In the 120 VAC mode, 120 VAC is provided at the outlets 56, 58 of first and second cycloconverters 42, 44, respectively, and outlet 60 is shorted by switch 46. Operating cycloconverters 42, 44 in this manner allows switch 46 to be a single-pole switch, such as a single pole relay.

It should be understood that this technique of operating the two sources of 120 VAC in phase when they are connected in parallel for the 120 VAC mode and 180 degrees out of phase when they are connected in series for the 240/120 VAC mode can be used with 120 VAC sources having AC power converters other than cycloconverters, such as (by way of example and not of limitation) with inverter circuits or H-Bridge circuits as disclosed in U.S. Ser. No. 10/077219 filed Feb. 15, 2002 for "Alternator/Inverter with Dual H-Bridge" and in U.S. Ser. No. 10/077386 filed Feb. 15, 2002 for "Alternator/Inverter with Dual H-Bridge and Automatic Voltage Regulation". The disclosures of these two applications are incorporated herein in their entirety by reference.

FIG. 2 shows in simplified form an overall power system diagram of generator system 10. Permanent magnet generator 14 has, as mentioned, two independent sets of three phase windings, windings 200, 202. Illustratively, permanent magnet generator 14 has a nominal 106 VAC RMS phase voltage (to neutral/star point), 240 Hz electrical at the shaft or rotor, with a phase inductance of 0.7 milli-Henry. It should be understood that permanent magnet generator 14 could be configured so that nominal output values are different. The windings of three phase windings 200 are identified as $A_1$, $B_1$ and $C_1$ and the windings of three phase windings 202 are identified as $A_2$, $B_2$ and $C_2$. Cycloconverter 42 illustratively has two banks of switching devices, positive bank 204 and negative bank 206 and cycloconverter 44 also illustratively has a positive bank 208 and a negative bank 210 of switching devices. In an aspect of the invention, the switching devices are naturally commutated switching devices, such as silicon controlled rectifiers. But it should be understood that other types of naturally commutated switching devices can be used. Each bank 204, 206, 208, 210 illustratively has six silicon controlled rectifiers. The positive and negative banks 204, 206, 208, 210 of first and second cycloconverters 42, 44, respectively, form a non-circulating current 6-pulse system. Non-circulating refers to the mode of operation where the positive and negative banks of each cycloconverter 42, 44 do not conduct at the same time. That is, when the current out of a cycloconverter 42, 44 is positive, only the positive bank 204, 208, respectively, of the cycloconverter 42, 44 conducts and when the current out of a cycloconverter 42, 44 is negative, only the negative bank 206, 210, respectively, of the cycloconverter 42, 44 conducts. As such, the positive and negative banks 204 and 206 of cycloconverter 42 are operated so that they do not conduct at the same time and the positive and negative banks, 208, 210 of cycloconverter 44 are also operated so that they do not conduct at the same time.

Cycloconverters 42, 44 each have an output filter capacitor 212, 214 coupled across their respective 120 VAC outputs, shown representatively as resistances 216, 218. The 240 VAC output is shown representatively as resistance 220. Illustratively, filter capacitors 212, 214 are 40 microfarad capacitors and 120 VAC outputs 216, 218 of cycloconverters 42, 44 each have a 3.6 Kw capacity when permanent magnet generator 14 has the nominal output values referenced above.

When generator system 10 is in the 120 VAC mode, DSP 28 controls cycloconverter 42, 44 so that their output voltages are in phase with each other and when generator system 10 is in the 240/120 VAC mode, cycloconverters 42, 44 are controlled so that their output voltages are 180 degrees out of phase. Thus, only the operation of cycloconverter 42 will be described. In this regard, the silicon controlled rectifiers of the positive bank 204 of cycloconverter 42 are identified as AT+, BT+, CT+, AB+, BB+ and CB+. The silicon controlled rectifiers of the negative bank 206 of cycloconverter 42 are identified as AT−, BT−, CT−, AB−, BB− and CB−.

Figure 3:
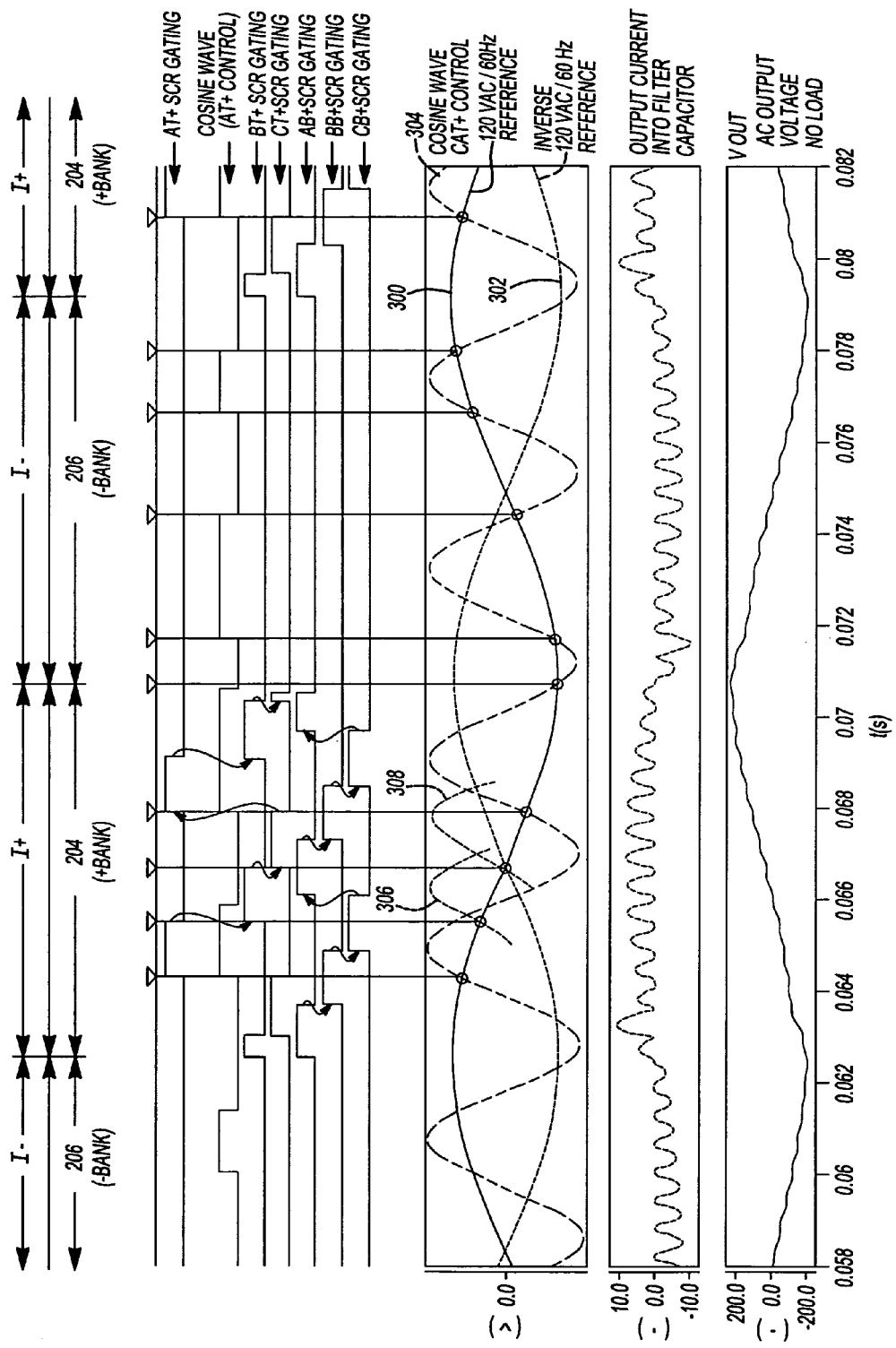
FIG. 3 is a timing diagram for control of a cycloconverter of the generator system of FIG. 1.

Turning to FIGS. 2 and 3, the control of cycloconverter 42 is described. Cycloconverter 42 is controlled by DSP 28 using conventional cosine control. The inputs to DSP 28 are the three-phase electrical outputs 30, 32, 34 of windings $A_1$, $B_1$ and $C_1$ of permanent magnet generator 14, the back-emf voltage waveforms of the windings of $A_1$, $B_1$ and $C_1$ of permanent magnet generator 14, and the output AC voltage and current of cycloconverter 42 as output to filter capacitor 212 and 120 VAC output 216, and the load in terms of impedance and power factor. Since the back-emf voltage waveforms of permanent magnet generator 14 are not practically measurable, in an aspect of the invention, signals from rotor position sensors 16, 18 and 20 are used by DSP 28 to simulate the back-emf voltage waveforms and develop the control wave information (illustratively, cosine control waves) for firing control of the silicon controlled rectifiers of positive and negative banks 204, 206 of cycloconverter 42, as described in more detail below. (The terms waveforms and waves are used interchangeably herein. Also, it should be understood that a wave may be digital data representative of the wave as well as an analog signal.)

Each SCR is controlled in terms of the turn-on instant, but turn-off is controlled by turning on another SCR that reverse biases the first SCR, a process known as natural commutation. The SCRs of positive bank 204 can be turned on only when the output current from the SCR's AT−, BT−, CT−, AT+, BT+ and CT+ is positive. With reference to the timing diagram of FIG. 3, the three SCRs identified as AT+, BT+ and CT+ are fired in a continuing sequence (AT+, BT+, CT+ and starting the sequence again with AT+) by a 3-bit ring counter implemented in DSP 28 as long as the output current from the SCR's AT−, BT−, CT−, AT+, BT+ and CT+ of cycloconverter 42 is positive. The three SCRs identified as AB+, BB+ and CB+ are also fired in a perpetual sequence by a second 3-bit ring counter implemented in DSP 28 as long as the output current from the SCR's AT−, BT−, CT−, AT+, BT+ and CT+ of cycloconverter 42 is positive. The transitions sequencing the two 3-bit ring counters implemented in DSP 28 are the comparison points comparing a reference voltage wave 300 (AT+, BT+, CT+) and an inverse reference voltage wave 302 (AB+, BB+, CB+) of reference voltage wave 300, both generated by DSP 28, to the corresponding cosine wave of the back-emf voltages of windings $A_1$, $B_1$ and $C_1$ of permanent magnet generator 14. For purposes of clarity, FIG. 3 shows only a full cycle of the cosine wave 304 used to control AT+, which is the cosine wave of the winding $A_1$ voltage (i.e., the inverted $B_1$ voltage), and partial cycles of the cosine waves 306, 308 used to control BT+ and CT+. As shown in FIG. 3, when positive bank 204 is enabled, AT+ is triggered when the cosine wave 304 becomes positive with respect to reference voltage wave 300. BT+ is then triggered when the cosine wave 306 becomes positive with respect to reference voltage wave 300. BT+ turning on reverse biases AT+, turning it off. Similarly, CT+ is then triggered when cosine wave 308 becomes positive with respect to reference voltage wave 300 and reverse biases BT+, turning it off. AB+, BB+ and CB+ are comparably controlled. The turn-on sequence for one electrical cycle of permanent magnet generator 14 where the output current from the SCR's AT−, BT−, CT−, AT+, BT+ and CT+ of cycloconverter 42 is positive is AT+, CB+, BT+, AB+, CT+ and BB+. In this regard, AT+, BT+ and CT+ each stay on until they are reversed biased by the next AT+, BT+ and CT+ turning on. Each of AB+, BB+ and CB+ similarly stay on until they are reverse biased by the next AB+, BB+ and CB+ turning on. Thus, there is always one of AT+, BT+ and CT+ on and one of AB+, BB+ and CB+ on at the same time when positive bank 204 is enabled.

Negative bank 206 of cycloconverter 42 is controlled in a similar arrangement. The SCRs of negative bank 206 can be turned-on only if the output current from the SCR's AT−, BT−, CT−, AT+, BT+ and CT+ of cycloconverter 42 is negative. The turn-on sequence for one electrical cycle where the output current from the SCR's AT−, BT−, CT−, AT+, BT+ and CT+ of cycloconverter 42 is negative is AT−, CB−, BT−, AB−, CT− and BB−.

Illustratively, comparators are implemented in DSP 28 that compare the cosine wave information for the cosine waves, such as cosine waves 304, 306, 308, to the reference voltage wave information for the reference voltage waves, such as reference voltage waves 300, 302, and, along with the 3-bit ring counters implemented in DSP 28, provide the above described control of positive and negative banks 204, 206 of cycloconverter 42. Comparable control of cycloconverter 44 is also implemented in DSP 28.

As mentioned, signals from rotor position sensors 16, 18 and 20 are used by DSP 28 to simulate the back-emf voltage waveforms and develop the cosine wave information for firing control of the SCRs of positive and negative banks 204, 206 of cycloconverter 42 and also for positive and negative banks 208, 210 of cycloconverter 44. A typical brushless DC motor drive for low speed, high torque applications (used to start engine 12 of generator system 10 in an aspect of the invention described below) requires three hall effect transducers installed within the motor to sense the position of the rotor. These hall effect transducers provide on/off logic signals which provide the phase relationship for the 3-phase excitation of the motor. Normally, each hall effect transducer provides a transition (e.g., logic 0 to 1) at the zero degree electrical and 180 degree electrical (e.g., logic 1 to 0 transition) of the motor for each of the three phase line voltages. Therefore, the output of each hall effect transducer is displaced 120 degrees from the outputs of the other two hall effect transducers so that the three hall effect transducers provide six transitions per rotation of the rotor of permanent magnet generator 14.

The signals generated by the hall effect transducers that illustratively are rotor position sensors 16, 18, 20, can directly represent the phasing of the output voltages of permanent magnet generator 14 when permanent magnet generator 14 is driven by engine 12. Rotor position sensors 16, 18, 20 will sometimes be referred to hereinafter as hall effect transducers 16, 18, 20. Importantly, the signals generated by hall effect transducers 16, 18, 20 directly represent the back-emf voltage phasing of permanent magnet generator 14 and this information is used to control the commutation of the SCRs in cycloconverters 42, 44. Using hall effect transducers 16, 18, 20 in this manner eliminates the need for filtering with zero phase shift using terminal voltage information (the voltages at the outputs 30, 32, 34, 36, 38, 40) of permanent magnet generator 14, and eliminates the need to compute the back-emf voltages from the actual terminal voltages of permanent magnet generator 14 (i.e., computation of the internal phase shift of permanent magnet generator 14 caused by load current and internal reactance). Moreover, since hall effect transducers 16, 18, 20 are illustratively the hall effect transducers used for starting engine 12 when using a brushless DC motor drive to drive permanent magnet generator 14, no additional hall effect transducers are needed.

Figure 6:
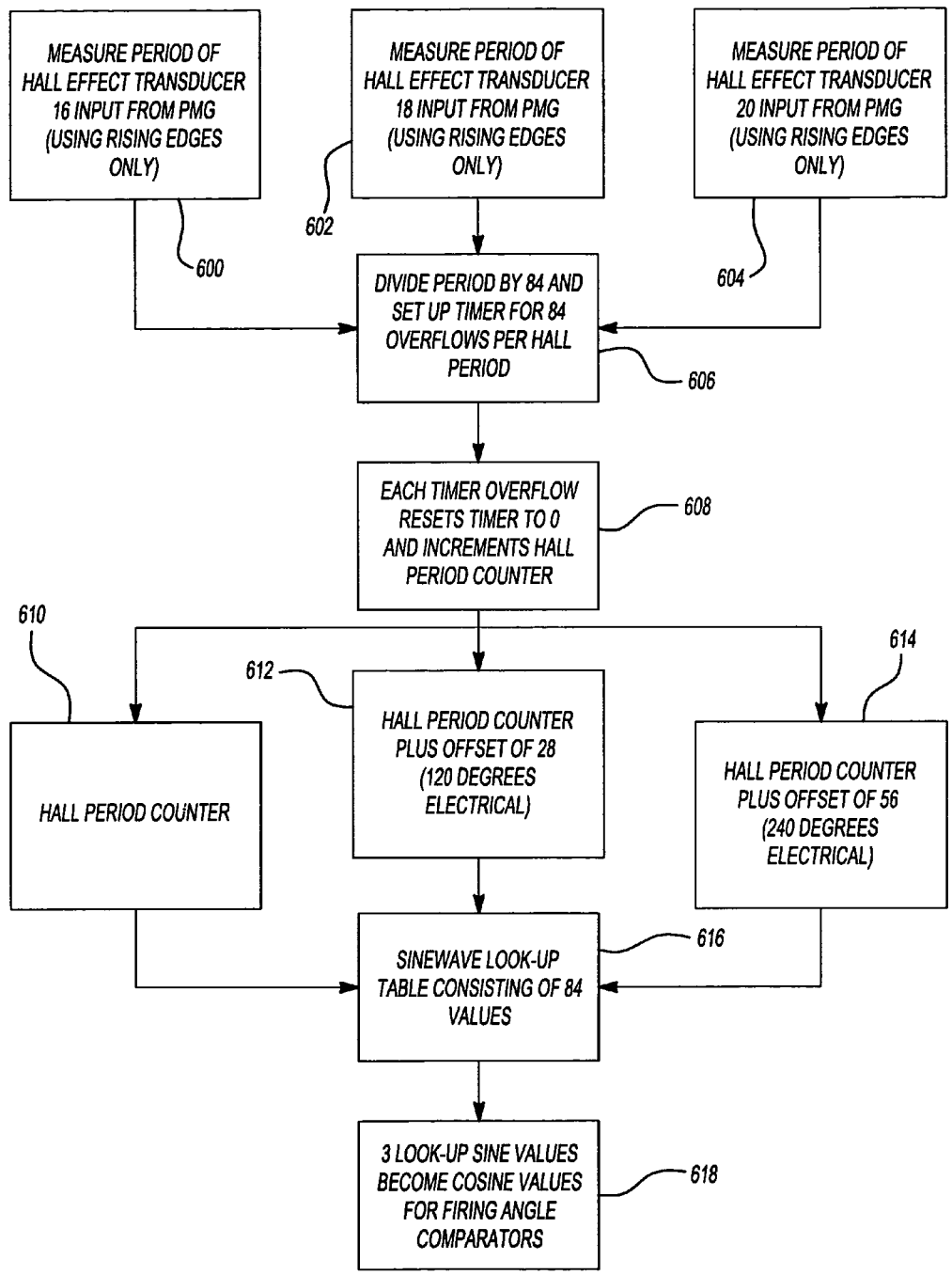
FIG. 6 is a flow chart showing the development of cosine wave information from outputs of rotor position sensors of a permanent magnet generator of the generator system of FIG. 1.

Turning to FIG. 6, logic that is illustratively used in DSP 28 to develop the cosine control wave information for use in controlling the commutation of the SCRs of cycloconverters 42, 44 is described. The periods of each hall effect transducer 16, 18, 20 are measured (using rising edges only) at 600, 602, 604 to establish a period ("Hall period"). This Hall period is updated on each rising edge of a hall effect transducer 16, 18, 20. At 606, the Hall period is divided by 84 to establish a period for a timer so that the timer will have 84 overflows per Hall period, i.e., time out 84 times per Hall period. At 608, each timer overflow resets the timer to zero and increments a counter ("Hall period counter") by one.

The value of the Hall period counter, the value of the Hall period counter plus an offset of 28 (120 degrees electrical) and the value of the Hall period counter plus an offset of 56 (240 degrees electrical) are then used as pointers into a sine wave look-up table having 84 entries. The three entries in this sine wave look-up table pointed to by these pointers are read from the sine wave look-up table at 616 and at 618 these three values become the cosine values that are compared to the reference voltage wave, such as reference voltage wave 300, to control the commutation of the SCRs of cycloconverter 42. Cycloconverter 44 is similarly controlled.

Figure 4:
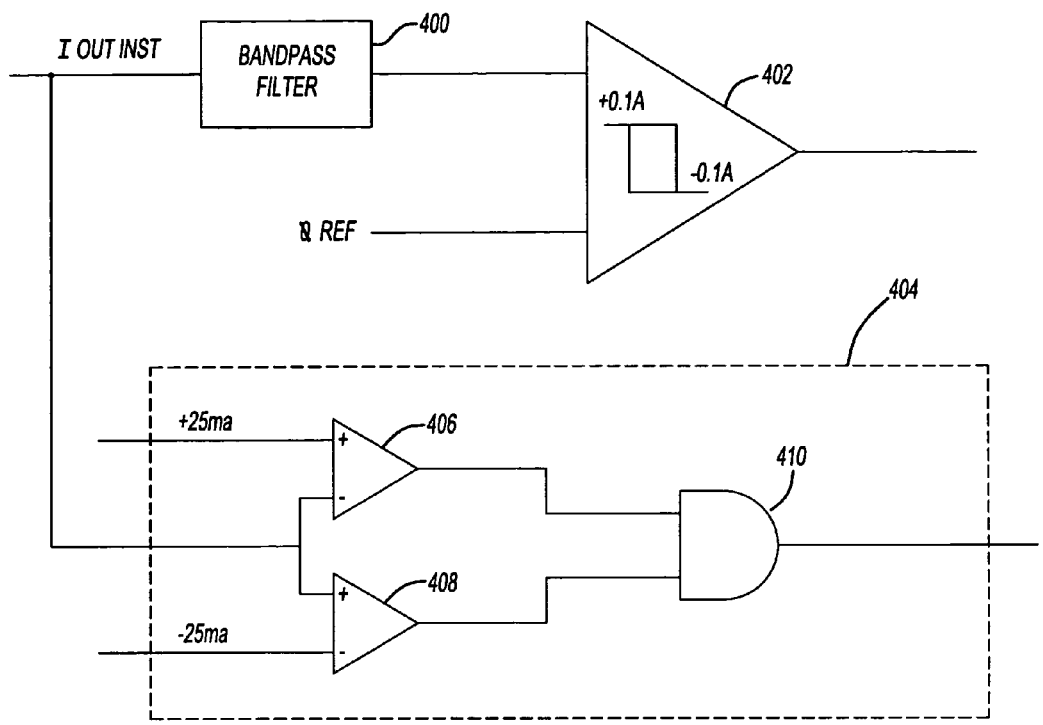
FIG. 4 is a simplified schematic of circuit logic for initiating changeover between a positive and negative bank of a cycloconverter of the generator system of FIG. 1.

With reference to FIG. 4, bank selection and changeover control in accordance with an aspect of the invention is described. As mentioned, for each cycloconverter 42, 44, only its positive bank 204, 208 or negative bank 206, 210 can be on at any given time. Bank selection and changeover control of cycloconverters 42, 44 is done identically, so it will be described with reference to cycloconverter 42.

Assuming that the output voltage at output 216 of cycloconverter 42 is a sine wave with a frequency of 60 Hz, positive and negative banks 204, 206 are each on for one-half period of the 60 Hz cycle. Which of the positive and negative banks 204, 206 that is conducting is determined by the polarity of the output current from the SCR's AT−, BT−, CT−, AT+, BT+ and CT+, which for the purposes of this discussion is assumed to be at the same 60 Hz frequency but with a power factor dependent on load.

The selection of positive and negative banks 204, 206 (i.e., which one is enabled so that its SCRs can be triggered to conduct and which one is disabled so that its SCRs cannot be triggered to conduct) is determined from the measured instantaneous output current of cycloconverter 42 to filter capacitor 212 and output 216. This instantaneous current is filtered, illustratively by bandpass filter 400, to eliminate current ripple and to ensure that the fundamental 60 Hz component of the signal output by bandpass filter 400 does not have any phase-shift relative to the instantaneous current. Illustratively, bandpass filter 400 is a 2-pole 60 Hz bandpass filter having a Q of 2. The filtered current signal output from bandpass filter 400 is then input to a comparator 402. Comparator 402 is illustratively a hysteresis comparator, illustratively having a negative hysteresis with switching levels of either +0.1 A or −0.1 A. The output of comparator 402 determines whether the fundamental 60 Hz current to filter capacitor 212 and output 216 of cycloconverter 42 is positive or negative. Comparator 402 switches from positive to negative when the filtered current signal output by bandpass filter 400 drops below +0.1 A and switches from negative to positive when the filter current signal output by bandpass filter 400 increases above −0.1 A. When comparator 402 switches from positive to negative, DSP 28 disables positive bank 204 of cycloconverter 42 and, following a delay of 100 microseconds after an actual output current zero is detected, enables negative bank 206 of cycloconverter 42. As such, no more trigger pulses are fed to the gate terminals of the SCRs in positive bank 204. However, the SCRs in the positive bank 204 that are conducting when this transition occurs will continue to conduct until a true current zero occurs. At this point, they will be reversed biased and turn off. Conversely, when comparator 402 switches from negative to positive, DSP 28 disables negative bank 206 of cycloconverter 42, and, following a delay of 100 microseconds after an actual output current zero is detected, enables positive bank 204. As was the case with positive bank 204, the SCRs in negative bank 206 that are conducting when this transition occurs will continue to conduct until a true current zero occurs, at which time they are reversed biased and turn off.

The true current zero condition may be sensed by comparator 404. Comparator 404 is illustratively a two-window comparator that determines when the actual output current (not the filtered fundamental current) drops within a window of +/−25 mA. Comparator 404 illustratively has first and second comparators 406, 408 having their outputs coupled to inputs of an AND gate 410. A positive input of comparator 406 is coupled to a +25 mA reference and a negative input of comparator 408 coupled to a −25 mA reference. The current output to filter capacitor 212 and output 216 of cycloconverter is coupled to a negative input of comparator 406 and to a positive input of comparator 408. When the output current falls within the +/−25 mA window, the outputs of both comparators 406, 408 will be positive, resulting in the output of AND gate 410 being positive, indicating a true current zero. In an aspect of the invention described below, the true current zero condition is sensed indirectly by sensing the voltages across the SCRs of cycloconverters 42, 44.

Once this true zero current condition is detected, a delay is imposed, illustratively, 100 microseconds, to ensure that the SCRs presently conducting have enough time to turn off. After this delay, change over from positive bank 204 to negative bank 206 (or vice-versa) occurs.

It should be understood that the above bank changeover control logic is illustratively implemented in DSP 28. However, it should also be understood that all or portions of the above bank changeover control could be implemented using discrete components, such as using voltage sensing circuit 800 to indirectly determine the true current zero condition, as described below.

For a generator system, the output voltage is a sinusoidal waveform having the voltage and frequency required by of the country where it is used, for example, 120 VAC, 60 Hz in the United States. A scaled equivalent(s) of this waveform, for example, waves 300, 302 in FIG. 3, is used in the control of the SCRs of cycloconverter 42 (and cycloconverter 44). However, some form of output voltage control is needed owing to the fact that the voltage generated by generator system 10 (FIG. 1) is directly proportional to the speed at which the rotor of permanent magnet generator 14 is spinning and that the load on permanent magnet generator 14 causes a voltage drop across a phase reactance of permanent magnet generator 14.

Figure 5:
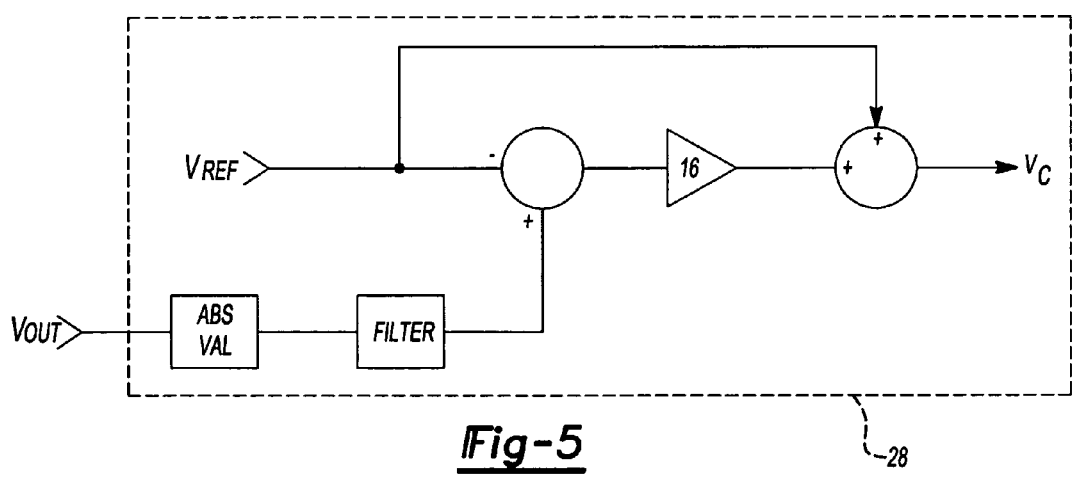
FIG. 5 is a simplified schematic of circuit logic for voltage control of the generator system of FIG. 1.

FIG. 5 shows an illustrative voltage control implemented in DSP 28. The instantaneous output voltage (Vout) of generator system 10 is measured and input into DSP 28. The absolute value of Vout is then filtered and, after being suitably scaled, is used as the feedback term in a proportional feedback loop. The filter that filters the absolute value of Vout is illustratively a 2-pole low pass filter with a cut-off frequency of 3.2 Hz and a Q of 0.25. The output of this filter is an average value of the absolute value of Vout with the 60 Hz/120 Hz components removed. The scaling factor used to scale the output of this filter is illustratively 0.00926 such that a value of 1.0 corresponds to a sinusoidal AC output voltage of 120 VAC RMS.

The input reference, Vref, to the feedback loop is the average value of the reference voltage wave generated by DSP 28 and is assigned a value of 1.0, such as reference voltage wave 300 (FIG. 3), which corresponds to a 120 VAC 60 Hz sine wave. The output (Vc) of the proportional feedback loop is used to directly control the effective magnitude of the cosine waves for SCR firing control, such as cosine waves 304, 306, 308 (FIG. 3). The proportional gain used is 16, where a proportional output at Vc of 1.0 produces the maximum output voltage at the output of cycloconverters 42, 44. A proportional output value at Vc of 2.0 produces one-half the maximum output voltage at the output of cycloconverter 42. Therefore, the proportional feedback loop of FIG. 5 is set up such that as the output voltage of cycloconverter 42 drops below 120 VAC, the output of the proportional gain stage of the proportional feedback loop of FIG. 5 reduces, causing the output voltage of cycloconverter 42 to increase, providing output voltage control for generator system 10. Comparable control is provided for cycloconverter 44.

Referring to FIGS. 1 and 2, as discussed, switch 46 is illustratively a relay and is illustratively controlled by a switch 62 on a front panel (not shown) of generator system 10. Switch 62 illustratively provides an input signal to DSP 28 that in turn controls switch 46.

Operating cycloconverters 42, 44 in series or parallel doesn't present any particular problems. However, the transition between series and parallel operation requires careful timing control.

DSP 28 controls the transition of generator system 10 between series (240/120 VAC) and parallel (120 VAC) operation. When switch 62 is thrown to switch generator system 10 from series (240/120 VAC) operation to parallel (120 VAC) operation, the outputs of one of first and second cycloconverters 42, 44 are disabled (i.e., all its SCRs are no longer turned on). After an appropriate delay, illustratively 3.5 electrical 60 Hz or 50 Hz cycles, that cycloconverter 42, 44 is re-enabled in phase with respect to the output voltage of the other cycloconverter 42, 44. Switch 46 is then closed.

The transition from parallel (120 VAC) to series (240/120 VAC) operation is controlled by DSP 28 in similar fashion. When switch 62 is thrown to switch generator system 10 from parallel to series operation, switch 46 is immediately opened. The outputs of first and second cycloconverters 42, 44 are both disabled (all their SCRs are no longer turned on). After an appropriate delay, illustratively 3.5 electrical 60 Hz or 50 Hz cycles, first and second cycloconverters are re-enabled with 180 degrees phase shift between their outputs.

In an embodiment of the invention, a DSP 28 is provided to control cycloconverter 42 and a second DSP 28 is provided to control cycloconverter 44 with the two DSPs 28 linked via a high speed 2-way isolated serial communication link to handle the control between the first and second cycloconverters 42, 44. Illustratively, the DSP 28 for first cycloconverter 42 defines the phasing of the 60 Hz output waveform to the DSP 28 for the second cycloconverter 44 and also provides output voltage and current measurement information to the DSP 28 for the second cycloconverter 44 to keep first cycloconverter 42 and second cycloconverter 44 synchronized. Each DSP 28 may illustratively be a TMS320LC2402A available from Texas Instruments, Inc. of Dallas, Tex.

Figure 8:
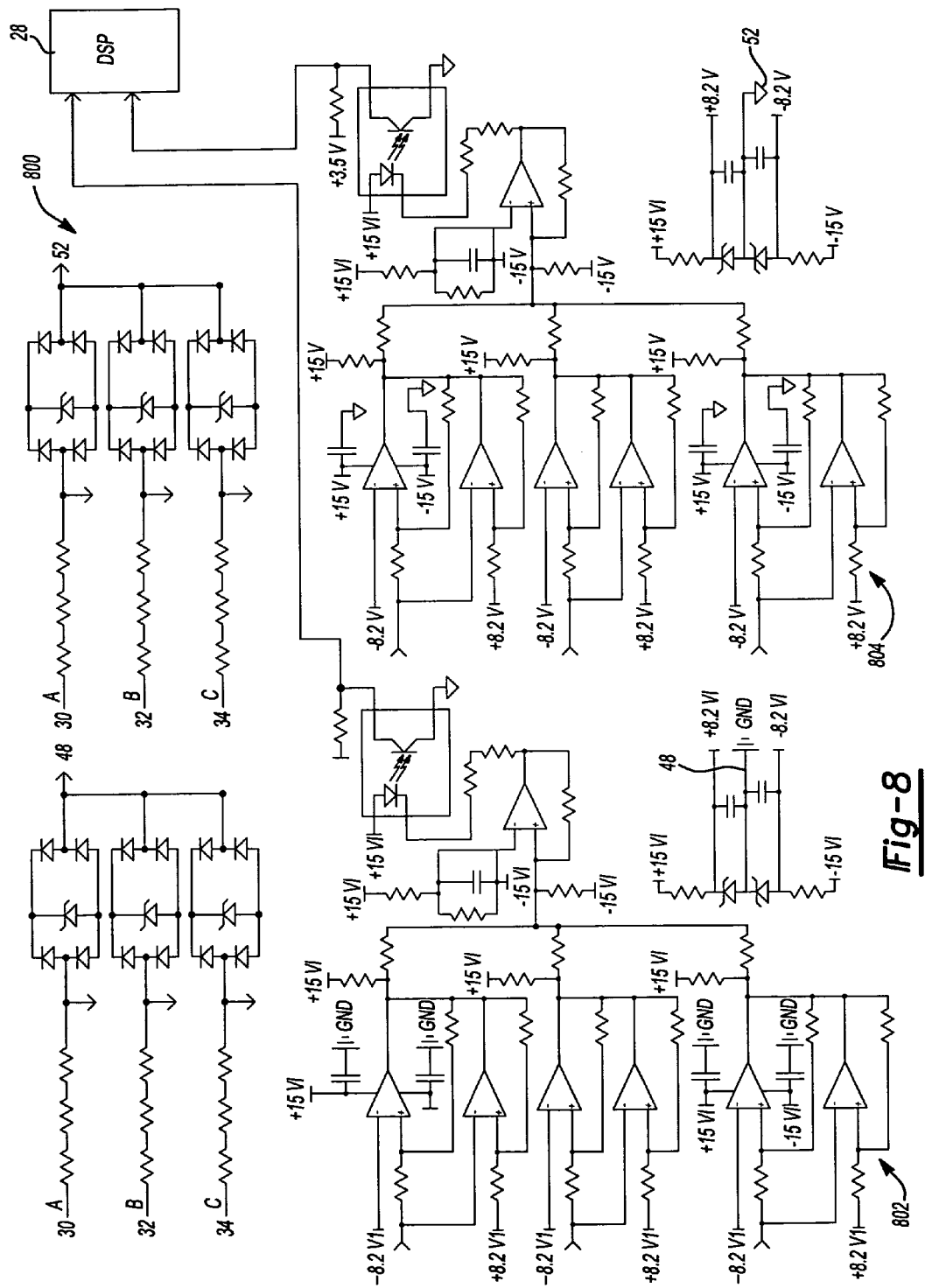
FIG. 8 is a schematic of a voltage sensing circuit that senses the voltages across the SCRs of a cycloconverter of the generator system of FIG. 1.
Figure 10:
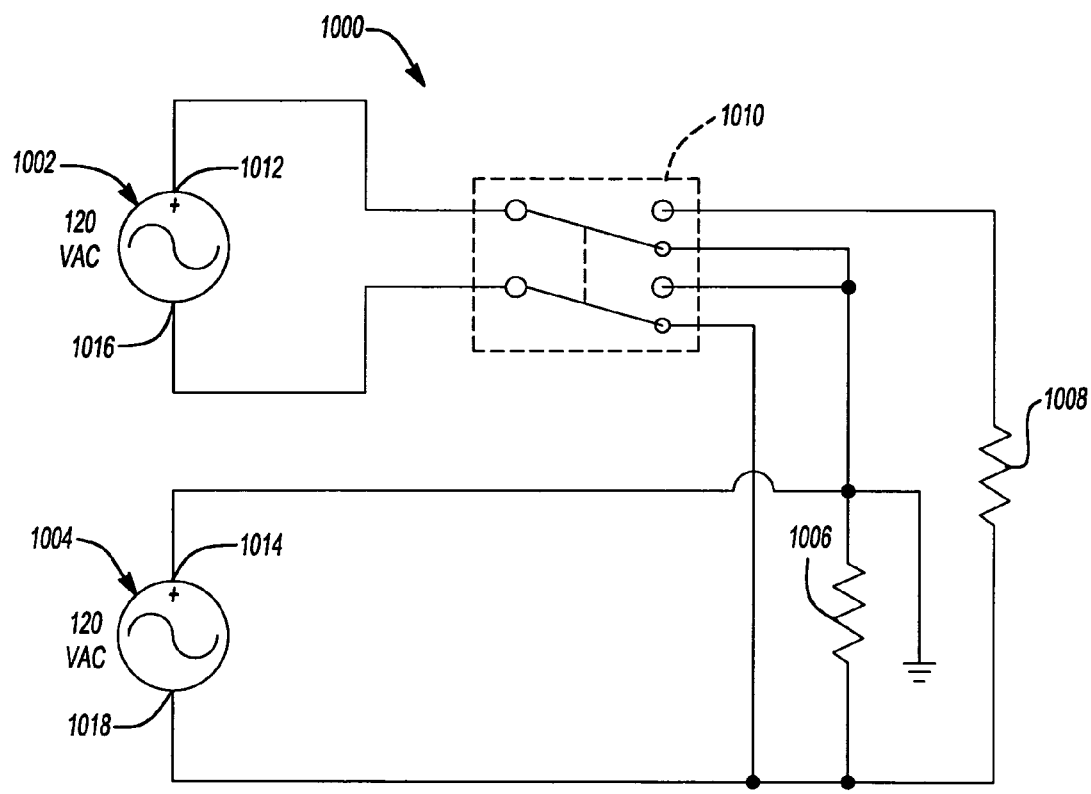
FIG. 10 is a simplified schematic of a prior art multi-pole switching arrangement for switching two 120 VAC sources between parallel and series connected modes.

In aspect of the invention, the true instantaneous zero current condition at the output of each cycloconverter 42, 44 may be detected indirectly by monitoring the three phase voltages output by permanent magnet generator 14 to the first and second outputs of the respective cycloconverters 42, 44. This is done identically for both cycloconverters 42, 44, so it will be described with reference to cycloconverter 42. The voltages from the outputs 30, 32, 34, of permanent magnet generator 14 to the live and neutral outputs 48, 52 of cycloconverter 42 are sensed by sensing the voltages across each of the SCRs of the positive and negative banks 204, 206 of cycloconverter 42. When the voltage across any of the SCRs of cycloconverter 42 is less than a certain absolute value, such as ±8 to 9 volts, this means that the SCR is conducting and the output current of the cycloconverter of which that SCR is part is not zero. When there is more than +8 to +9 volts or less than −8 to −9 volts across all the SCRs of cycloconverters 42, it means that all the SCRs of cycloconverter 42 are blocking and the output of cycloconverter 42 is at the zero current condition. This zero current condition is processed into a digital signal and input into DSP 28 where it is used for bank changeover control as discussed above. FIG. 8 is a schematic of such a voltage sensing circuit 800 that senses the voltages across the SCRs of cycloconverter 42. Voltage sensing circuit 800 includes voltage sensing circuit 802 that senses the voltages across the SCRs identified as AT+, AT−, BT+, BT−, CT+ and CT− of positive and negative banks 204, 206 of cycloconverter 42 and voltage sensing circuit 804 that senses the voltages across the SCRs identified as AB+, AB−, BB+, BB−, CB+ and CB− of positive and negative banks 204, 206 of cycloconverter 42.

Figure 7:
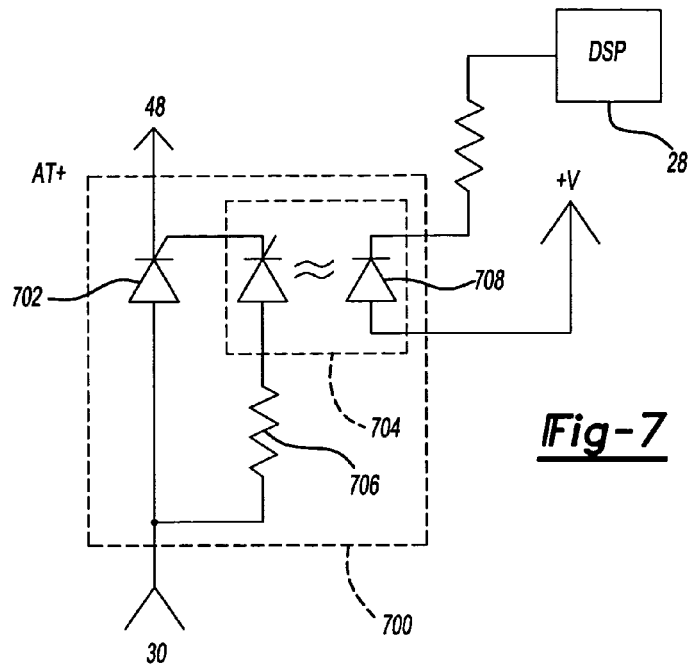
FIG. 7 is a simplified schematic of an SCR/opto-SCR combination used in a cycloconverter of the generator system of FIG. 1.

In an aspect of the invention, the SCRs of positive and negative banks 204, 206 of cycloconverter 42 and 208, 210 of cycloconverter 44 are illustratively SCR/opto-SCR combinations. With reference to FIG. 7, a SCR/opto-SCR combination 700 is shown for the SCR of positive bank 204 of cycloconverter 42 identified as AT+. SCR/opto-SCR combination 700 has an SCR 702 having its anode coupled to output 30 of permanent magnet generator 14 (FIG. 1) and its cathode coupled to output 48 of cycloconverter 42 (FIG. 1). A gate of SCR 702 is coupled to the cathode of an opto-SCR 704. An anode of opto-SCR 704 is coupled through a resistor 706 to the anode of SCR 702. A gate light emitting diode 708 of opto-SCR 704 is coupled to an output of DSP 28. SCR 702 is illustratively a S6016R available from Teccor Electronics of Irving, Tex., and opto-SCR 704 is illustratively a TLP741J available from Toshiba America Electronic Components, Inc. of Irvine, Calif.

Figure 9:
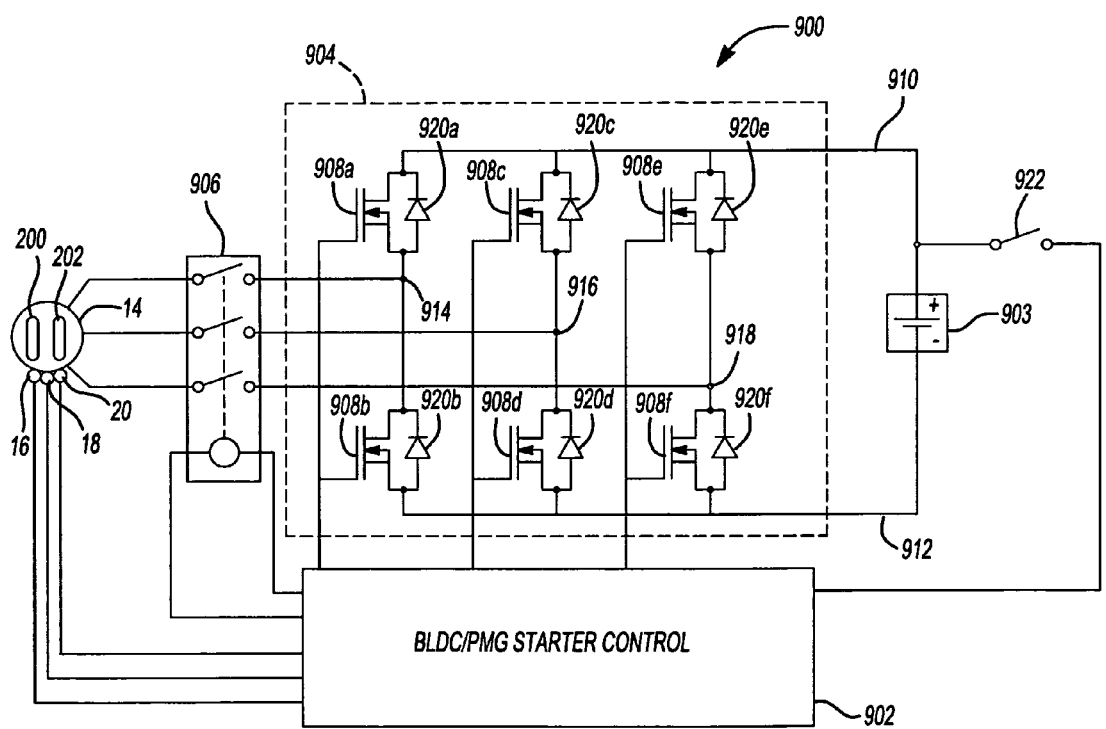
FIG. 9 is a simplified schematic of a brushless DC motor drive circuit that can be used in starting the generator system of FIG. 1.

FIG. 9 is a simplified schematic drawing of an aspect of the invention where a brushless DC drive circuit 900 is used in combination with generator system 10 (FIG. 1) to drive permanent magnet generator 14 for starting engine 12 (FIG. 1), similar to that which is described in the above referenced U.S. Ser. No. 60/077219 "Starter System for Portable Internal Combustion Engine electric Generators Using a Portable Universal Battery Pack." Circuit 900 is a low voltage DC to AC 3-phase inverter that incorporates a Brushless DC/Permanent magnet generator (BLDC/PMG) starter control 902, and is powered directly by a battery, illustratively, a universal battery pack 903, such as a universal battery pack from the DEWALT XR PLUS (Extended Run Time) universal battery pack line. DC drive circuit 900 includes a power stage 904 that is electrically connectable to permanent magnet generator 14 through a 3-pole relay switch 906. Power stage 904 includes six identical power switching devices 908a–908f coupled across DC bus lines, or rails, 910 and 912. Power switching devices 908a and 908b are connected in series between bus lines 910 and 912 having a center node 914 electrically connected to one pole of relay 906. Power switching devices 908c and 908d are connected in series between bus lines 910 and 912 having a center node 916 electrically connected to a second pole of relay 906. Power switching devices 908e and 908f are similarly connected in series between bus lines 910 and 912 having a center node 918 electrically connected to a third pole of relay 906. Six diodes 920a–920f are respectively connected in parallel with switching devices 908a–908f, between bus lines 910 and 912. Switching devices 908a–908f may comprise a variety of suitable power switching components, for example field effect transistors (FET's), insulated gate bi-polar transistors (IGBTs), or metal oxide silicon field effect transistors (MOSFET's).

The hall effect transducers 16, 18, 20 of permanent magnet generator 14 are connected to inputs of BLDC/PMG starter control 902. Additionally, DC drive circuit 250 includes a momentary starter switch 922 that controls the flow of current from universal battery pack 903 to BLDC/PMG starter control 902.

In operation, engine 12 is initially at rest. Engine 12 is started by a user closing momentary start switch 922. The BLDC/PMG starter control 902 will then become energized by universal battery pack 903. Provided the hall effect transducers 16, 18, 20 indicate that either the speed of engine 12 or the speed of permanent magnet generator 14 is less than a predetermined value, e.g. 500 rpm, 3-pole relay switch 906 will be energized by BLDC/PMG starter control 902, thereby connecting the 3-phase power stage 904 to permanent magnet generator 14. Utilizing information from hall effect transducers 16, 18, 20, BLDC/PMG starter control 902 turns the switching devices 908a–908f on and off to provide torque to engine 12 using electronic commutation of the first set 200 of 3-phase windings (or a tapped winding from such) within permanent magnet generator 14. Engine 12 will be turned by permanent magnet generator 14, driven as a motor in a "Motor Mode" by power stage 904 under control of BLDC/PMG starter control 902, to accelerate engine 12 to a speed at which engine 12 starts. Once engine 12 has started, permanent magnet generator 14 is driven past a predetermined maximum speed, e.g. 500 rpm, and 3-pole relay switch 906 will then be de-energized by BLDC/PMG starter control 902, thereby disconnecting power stage 904 from permanent magnet generator 14. Disconnecting power stage 904 avoids overdriving universal battery pack 903 and supplying excessive voltage to switching devices 908a–908f. Once the starting operation is complete, momentary start switch 922 is opened and BLDC/PMG starter control 902 ceases turning switching devices 908a–908f on and off.

BLDC/PMG starter control 902 can be microprocessor based to simplify the electronic circuitry and to provide additional control features. Additional control features may include setting a maximum cranking time, e.g. five seconds, to avoid damage if momentary start switch 922 is held closed for too long, or not allowing starting when universal battery pack 903 does not have sufficient voltage to turn or start engine 12. Further control features provided by a microprocessor based BLDC/PMG starter control 902 include speed detection and control of 3-pole relay switch 906 to avoid overdriving universal battery pack 903 and power stage 904, or setting an upper starting speed of permanent magnet generator 14 regardless of the voltage of universal battery pack 903 by utilizing pulse width modulation control of switching devices 908a–908f above a minimum speed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A generator system having at least first and second modes, the generator system producing a first alternating current output voltage when in the first mode and producing the first alternating current output voltage and a second alternating current output voltage when in the second mode, the second output voltage being twice the first output voltage, comprising:
   first and second voltage sources each having an output at which they produce the first output voltage; and
   a switch coupling the outputs of the first and second voltage sources in parallel when the switch is in a first position and in series when the switch is in a second position, the first output voltage produced at the outputs of the first and second voltage sources when the switch is in the first position and the second output voltage produced across the series coupled outputs of the first and second voltage sources when the switch is in the second position with the first output voltage also produced at the outputs of the first and second voltage sources when the switch is in the second position.

2. The generator system of claim 1 wherein the current available at the first output voltage when the outputs of first and second voltage source are coupled in parallel is greater than the current available at the first output voltage when the outputs of the first and second voltage sources are coupled in series.

3. The generator system of claim 1 and further including a controller coupled to the first and second voltage sources, the controller operating the first and second voltage sources so that their first output voltages are in phase when the switch is in the first position and one-hundred and eighty degrees out of phase when the switch is in the second position.

4. The generator system of claim 3 wherein the controller includes a first controller for controlling the first voltage source and a second controller for controlling the second voltage source.

5. The generator system of claim 1 wherein the first and second voltage sources each include a generator coupled to an AC power converter having an output that provides the output of that first and second voltage source.

6. The generator system of claim 5 wherein a single generator having first and second sets of windings provides the generators of the first and second voltage sources, the first set of windings coupled to the AC power converter of the first voltage source to provide the generator of the first voltage source and the second set of windings coupled to the AC power converter of the second voltage source to provide the generator of the second voltage source.

7. The generator system of claim 6 wherein the AC power converters of the first and second voltage sources include cycloconverters.

8. The generator system of claim 7 and further including a controller coupled to the cycloconverters of the first and second voltage sources, the controller operating the cycloconverters of the first and second voltage sources so that they are in phase when the switch is in the first position and one-hundred and eighty degrees out of phase when the switch is in the second position.

9. The generator system of claim 8 wherein the controller operates the cycloconverters using cosine control.

10. The generator system of claim 9 wherein the generator includes at least one rotor position sensor that senses the position of a rotor of the generator and generates a signal indicative of the position of the rotor.

11. The generator system of claim 10 wherein the controller uses the rotor position signal to develop control waves which it uses to control the cycloconverters.

12. The generator system of claim 9 wherein the generator includes rotor position sensors that generate signals indicative of the position of the rotor that are displaced one-hundred and twenty degrees from each other.

13. The generator system of claim 12 wherein the controller uses the rotor position signals to develop control waves which it uses to control the cycloconverters.

14. The generator system of claim 13 wherein each cycloconverter includes a positive and a negative bank of naturally commutated switching devices.

15. The generator system of claim 14 wherein the controller generates a reference wave and controls the cycloconverters by generating firing signals for the naturally commutated switching devices based on comparisons of the control waves to the reference wave.

16. The generator system of claim 15 wherein the naturally commutated switching devices include silicon controlled rectifiers.

17. The generator system of claim 15 wherein each naturally commutated switching devices includes a silicon controlled rectifier/opto-silicon controlled rectifier combination.

18. The generator system of claim 15 wherein the first and second generators are three-phase generators with each of the first and second sets of windings having at least one winding for each phase.

19. The generator system of claim 10 wherein the generator includes an engine and a brushless DC motor drive circuit coupled to at least one set of the generator windings for driving the generator as a brushless DC motor to start the engine, the rotor position sensor coupled to a brushless DC motor controller of the brushless DC motor drive circuit.

20. The generator system of claim 19 and further including a portable universal battery pack coupled to the brushless DC motor drive circuit that provides DC power to the brushless DC motor drive circuit.

21. The generator system of claim 10 wherein the rotor position sensor includes a hall effect transducer.

22. The generator system of claim 10 wherein the controller simulates back emf voltage waveforms of the generator using the rotor position signal and develops control waves from the back emf voltage waveforms which it uses to control the cycloconverters.

23. The generator system of claim 12 wherein the generator includes an engine and a brushless DC motor drive circuit coupled to at least one set of the generator windings for driving the generator as a brushless DC motor to start the engine, the rotor position sensors coupled to a brushless DC motor controller of the brushless DC motor drive circuit.

24. The generator system of claim 23 wherein the rotor position sensors include hall effect transducers.

25. The generator system of claim 23 and further including a portable universal battery pack coupled to the brushless DC motor drive circuit that provides DC power to the brushless DC motor drive circuit.

26. The generator system of claim 12 wherein the rotor position sensors include hall effect transducers.

27. The generator system of claim 12 wherein the controller simulates back emf voltage waveforms of the generator using the rotor position signals and develops control waves from the back emf voltage waveforms which it uses to control the cycloconverters.

28. The generator system of claim 14 wherein the controller operates the positive and negative banks of naturally commutated switching devices of each cycloconverter in a non-circulating mode, the controller enabling one of the positive and negative banks and disabling the other of the positive and negative banks of each cycloconverter based on the instantaneous output current of that cycloconverter.

29. The generator system of claim 28 wherein the controller disables the positive bank of each of the cycloconverters when the instantaneous output current of that cycloconverter transitions from positive to negative, and then enables the negative bank of that cycloconverter only after a true zero current condition at the output of that cycloconverter occurs, the controller further disabling the negative bank of each of the cycloconverters when the instantaneous output current of that cycloconverter transitions from negative to positive and then enables the negative bank of that cycloconverter only after a true zero current condition at the output of that cycloconverter occurs.

30. The generator system of claim 29 wherein for each cycloconverter the true zero current condition at the output of that cycloconverter is determined by a comparator determining that actual output current of that cycloconverter is between first and second reference levels.

31. The generator system of claim 30 wherein the first and second reference levels are +25 mA and −25 mA.

32. The generator system of claim 29 wherein for each cycloconverter the controller determines that the true zero current condition at the output of that cycloconverter occurs by sensing that the positive and negative banks of that cycloconverter are non-conducting.

33. The generator system of claim 32 wherein the controller sensing that the positive and negative banks of one of the cycloconverters are non-conducting includes sensing that the voltage across each of the naturally commutated switching devices of the positive and negative banks of that cycloconverter is above a predetermined level.

34. The generator system of claim 29 and further including a bandpass filter for each cycloconverter for filtering the instantaneous output current of that cycloconverter to reduce current ripple and ensure that a signal output by the bandpass filter at a fundamental frequency does not have any phase-shift relative to the instantaneous output current of that cycloconverter, the signal output by the bandpass filter coupled to an input of a comparator that generates a signal indicative of whether the instantaneous output current transitioned from positive to negative or from negative to positive.

35. The generator system of claim 34 wherein the fundamental frequency is 60 Hz.

36. The generator system of claim 1 wherein the switch includes a single pole switch.

37. The generator system of claim 36 wherein the outputs of the first and second voltage sources each have live and neutral outputs, the single pole switch being one single pole relay with the single pole of the single pole relay coupled across the live output of the first voltage source and the live output of the second voltage source.

38. The generator system of claim 1 wherein the first output voltage is nominally 120 VAC and the second output voltage is nominally 240 VAC.

39. A generator system, comprising:
   an AC generator having an output coupled to a cycloconverter, the cycloconverter having a positive bank of naturally commutated switching devices and a negative bank of naturally commutated switching devices;
   a controller coupled to the naturally commutated switching devices of the positive and negative banks;
   a rotor position sensor for sensing the position of a rotor of the generator and generating a signal indicative of the position of the rotor, the rotor position sensor coupled to the controller; and
   the controller using the rotor position signal to develop control waves which it uses to control switching of the naturally commutated switching devices of the positive and negative banks.

40. The generator system of claim 39 wherein the rotor position sensor includes a plurality of rotor position sensors that generate signals indicative of the position of the rotor that are displaced one-hundred and twenty degrees from each other.

41. The generator system of claim 40 wherein the plurality of rotor position sensors include hall effect transducers.

42. The generator system of claim 40 wherein the controller generates a reference wave and generates firing signals for the naturally commutated switching devices of the positive and negative banks based on comparisons of the control waves to the reference wave.

43. The generator system of claim 42 wherein the AC generator includes an engine and a brushless DC motor drive circuit coupled to the AC generator for driving the AC generator as a brushless DC motor to start the engine, the rotor position sensors coupled to a brushless DC motor controller of the brushless DC motor drive circuit.

44. The generator system of claim 43 and further including a portable universal battery pack coupled to the brushless DC motor drive circuit that provides DC power to the brushless DC motor drive circuit.

45. The generator system of claim 40 wherein the cycloconverter includes first and second cycloconverters and for each cycloconverter the controller operates the positive and negative banks of that cycloconverter in a non-circulating mode, the controller enabling one of the positive and negative banks and disabling the other of the positive and negative banks based on the instantaneous output current of that cycloconverter.

46. The generator system of claim 45 wherein, for each cycloconverter, the controller enables one of the positive and negative banks of that cycloconverter and disables the other of the positive and negative banks of that cycloconverter based on the instantaneous output current of that cycloconverter transitioning between positive and negative or between negative and positive wherein the controller enables one of the positive and negative banks of that cycloconverter only after a true current zero condition occurs at the output of that cycloconverter.

47. The generator system of claim 46 wherein for each cycloconverter the true zero current condition at the output of that cycloconverter is determined by a comparator determining that actual current output current of that cycloconverter falls between first and second reference levels.

48. The generator system of claim 47 wherein the first and second reference levels are +25 mA and −25 mA.

49. The generator system of claim 46 wherein the controller determines that the true zero current condition at the output of one of the cycloconverters occurs by sensing that the positive and negative banks are non-conducting.

50. The generator system of claim 49 wherein the controller sensing that the positive and negative banks are non-conducting includes sensing that voltage across each of the naturally commutated switching devices and sensing that the positive and negative banks is above a predetermined level.

51. The generator system of claim 46 and further including a bandpass filter for filtering the instantaneous output current of each cycloconverter to reduce current ripple and ensure that a signal output by the bandpass filter at a fundamental frequency does not have any phase-shift relative to the instantaneous output current, the signal output by the bandpass filter coupled to an input of a comparator that generates a signal indicative of whether the instantaneous current output has transitioned from positive to negative or from negative to positive.

52. The generator system of claim 51 wherein the fundamental frequency is 60 Hz.

53. The generator system of claim 40 wherein the controller simulates back emf voltage waveforms of the generator using the rotor position signals and develops the control waves from the back emf voltage waveforms.

54. The generator system of claim 39 wherein the naturally commutated switching devices include silicon controlled rectifiers.

55. The generator system of claim 39 wherein each naturally commutated switching device includes a silicon controlled rectifier/opto-silicon controlled rectifier combination.

56. The generator system of claim 39 wherein the cycloconverter includes first and second cycloconverters and the controller includes a first controller for controlling the first cycloconverter and a second controller for controlling the second cycloconverter.

57. The generator system of claim 39 wherein the controller simulates back emf voltage waveforms of the generator using the rotor position signal and develops the control waves from the back emf voltage waveforms.

58. A generator system, comprising:
   an AC generator having an output coupled to a cycloconverter, the cycloconverter having a positive bank of naturally commutated switching devices and a negative bank of naturally commutated switching devices;

a controller coupled to the naturally commutated switching devices of the positive and negative banks;

the controller operating the positive and negative banks in a non-circulating mode, the controller enabling one of the positive and negative banks and disabling the other of the positive and negative banks based on the instantaneous output current of the cycloconverter; and a bandpass filter for filtering the instantaneous output current of the cycloconverter to reduce current ripple and ensure that a signal output by the bandpass filter at a fundamental frequency does not have any phase shift relative to the instantaneous output current, the signal output by the band pass filter coupled to an input of a comparator that generates a signal indicative of whether the instantaneous output current has transitioned from positive to negative or from negative to positive.

59. The generator system of claim 58 wherein the controller enables one of the positive and negative banks only after it disables the other of the positive and negative banks and it senses that an output of the cycloconverter has passed through a true zero current condition, the controller sensing that the true zero current condition at the output of the cycloconverter occurs when a voltage across each of the naturally commutated switching devices is above a predetermined level indicating that each of the naturally commutated switching devices is non-conducting.

60. The generator system of claim 58 wherein the fundamental frequency is 60 Hz.

61. The generator system of claim 58 wherein each naturally commutated switching device includes a silicon controlled rectifier/opto-silicon controlled rectifier combination.

62. A generator system, comprising:

an AC generator having an output coupled to a cycloconverter, the cycloconverter having a positive bank of naturally commutated switching devices and a negative bank of naturally commutated switching devices; and each naturally commutated switching device including a silicon controlled rectifier/opto-silicon controlled rectifier combination.

63. A method of controlling a generator system having at least first and second modes where the generator system produces a first alternating current output voltage when it is in the first mode and produces the first output voltage and a second alternating current output voltage when it is in the second mode, the second output voltage twice the first output voltage, comprising:

coupling the outputs of the first and second voltage sources in parallel and operating the first and second voltage sources so that the voltages at the outputs of the first and second voltage sources are in phase when the generator system is in the first mode; and coupling the outputs of the first and second voltage sources in series and operating the first and second voltage sources so that the voltages at the outputs of the first and second voltage sources are one-hundred and eighty degrees out of phase when the generator system is in the second mode with the second output voltage produced across the series coupled outputs of the first and second voltage sources and the first output voltage produced at each of the outputs of the first and second voltage sources.

64. The method of claim 63 including generating rotor position signals indicative of a position of a rotor of a permanent magnet generator and developing control waves from the rotor position signals, and using the control waves to control first and second cycloconverters, the first cycloconverter coupled to a first set of windings of the permanent magnet generator and the second cycloconverter coupled to a second set of windings of the permanent magnet generator, the first cycloconverter having an output that provides the output of the first voltage source and the second cycloconverter having an output that provides the output of the second voltage source.

65. The method of claim 64 including generating a reference wave, comparing the control waves to the reference wave, and controlling switching of naturally commutated switching devices of the first and second cycloconverters based on the comparisons of the control waves to the reference wave.

66. The method of claim 65 wherein generating the rotor position signal indicative of the position of the rotor of the permanent magnet generator includes generating rotor position signals that are displaced one-hundred and twenty degrees from each other.

67. The method of claim 66 wherein generating the rotor position signals includes generating them with hall effect transducers.

68. The method of claim 64 wherein the generator system includes an engine for driving the permanent magnet generator, the method including driving at least one of the first and second sets of windings of the permanent magnet generator with a brushless DC motor drive circuit to drive the permanent magnet generator as a brushless DC motor to start the engine, a brushless DC motor controller of the brushless DC motor drive circuit using the rotor position signals in driving the permanent magnet generator as a brushless DC motor.

69. The method of claim 68 further including using a portable universal battery pack coupled to the brushless DC motor drive circuit to supply DC power to the brushless DC motor drive circuit.

70. The method of claim 64 wherein each cycloconverter includes a positive and a negative bank of naturally commutated switching devices, the method including operating the positive and negative banks of each cycloconverter in a non-circulating mode and enabling one of the positive and negative banks and disabling the other of the positive and negative banks of each cycloconverter based on the instantaneous output current of that cycloconverter transitioning between positive and negative or between negative and positive wherein the one of the positive and negative banks of one of the cycloconverter that is being enabled is enabled only after a true current zero condition occurs at the output of that cycloconverter.

71. The method of claim 70 including determining that the true current zero condition occurs at the output of one of the cycloconverters when all of the naturally commutated switching devices of that cycloconverter are non-conducting.

72. The method of claim 71 including sensing the voltages across the naturally commutated switching devices of each cycloconverter and determining that all the naturally commutated switching devices of one of the cycloconverters are non-conducting when the voltages across all of the naturally commutated switching devices of that cycloconverter are above a predetermined level.

73. The method of claim 72 including bandpass filtering the instantaneous output current of each of the cycloconverters to produce a filtered signal from that instantaneous output current to reduce current ripple and ensure that a fundamental frequency component of each filtered signal does not have any phase-shift relative to the instantaneous output current of the cycloconverter being filtered, and comparing each of filtered signals to at least one reference level to determine whether the instantaneous output current of the corresponding cycloconverter transitioned from positive to negative or from negative to positive.

74. The method of claim 73 wherein the reference level includes first and second reference levels of +0.1A and −0.1A and the fundamental frequency is 60 Hz.

75. The method of claim 70 wherein a switch is coupled between the outputs of the first and second voltage sources, the method including:
switching the generator system from the first mode to the second mode by first opening the switch, then disabling the naturally commutated switching devices of the first and second cycloconverters so that they are all non-conducting, and after a predetermined delay, reenabling the naturally commutated switching devices of the first and second cycloconverters and operating the first and second cycloconverters so that the voltages produced at the outputs of the first and second cycloconverters are one-hundred and eighty degrees out of phase with each other, and switching the generator system from the second mode to the first mode by disabling the naturally commutated switching devices of one of the first and second cycloconverters, reenabling after a predetermined delay the naturally commutated switching devices that were disabled and operating the first and second cycloconverters so that the voltages produced at the outputs of the first and second cycloconverters are in-phase, and then closing the switch.

76. The method of claim 64 including simulating back emf voltage waveforms of the generator using the rotor position signals and developing the control waves from the back emf waveforms.

77. The method of claim 63 wherein coupling the outputs of the first and second voltage sources in one of parallel and series includes switching a single pole switch coupled across the outputs of the first and second voltage sources open to couple the outputs in series and closed to couple the outputs in parallel.

78. The method of claim 77 wherein the single pole switch is a single pole relay.

79. A method of controlling a generator system having an AC generator with an output coupled to a cycloconverter, the cycloconverter having a positive bank of naturally commutated switching devices and a negative bank of naturally commutated switching devices, the method comprising developing control waves based upon the position of a rotor of the AC generator and using the control waves to control switching of the naturally commutated switching devices.

80. The method of claim 79 wherein the generator system includes a plurality of rotor position sensors that generate signals indicative of the position of the rotor that are displaced one-hundred and twenty degrees from each other, the method including using the rotor position signals to generate the control waves.

81. The method of claim 80 including generating a reference wave, comparing the control waves to the reference wave and generating firing signals for the naturally commutated switching devices based on comparisons of the control waves to the reference wave.

82. The method of claim 81 wherein the generator system includes an engine for driving the AC generator, the method including driving the AC generator as a brushless DC motor to start the engine and using the rotor position signals in doing so.

83. The method of claim 82 and further Including using DC power of a portable universal battery of the generator system in starting the engine.

84. The method of claim 80 including operating the positive and negative banks of the cycloconverter in a non-circulating mode and enabling one of the positive and negative banks and disabling the other of the positive and negative banks based on the instantaneous output current of the cycloconverter produced at an output of the cycloconverter transitioning between positive and negative or between negative and positive wherein the one of the positive and negative banks being enabled is enabled only after a true zero current condition occurs at the output of the cycloconverter.

85. The method of claim 84 including determining that the true current condition occurs when all of the naturally commutated switching devices are non-conducting.

86. The method of claim 85 including sensing the voltages across the naturally commutated switching devices and determining that all the naturally commutated switching devices are non-conducting when the voltages across all of the naturally commutated switching devices are above a predetermined level.

87. The method of claim 86 including bandpass filtering the instantaneous output current of the cycloconverter to produce a filtered signal to reduce current ripple and ensure that a fundamental frequency component of the filtered signal does not have any phase-shift relative to the instantaneous output current, and comparing the filtered signal to at least one reference level to determine whether the instantaneous output current transitioned from positive to negative or from negative to positive.

88. The method of claim 87 wherein the reference level includes first and second reference levels of +0.1A and −0.1A.

89. The method of claim 79 including simulating back emf voltage waveforms of the generator based upon the position of the rotor and developing the control waves based on the back emf voltage waveforms.

90. A method of controlling a generator system having an AC generator with an output coupled to a cycloconverter, the cycloconverter having a positive bank of naturally commutated switching devices and a negative bank of naturally commutated switching devices, the method comprising operating the positive and negative banks of the cycloconverter in a non-circulating mode and enabling one of the positive and negative banks and disabling the other of the positive and negative banks based on the instantaneous output current of the cycloconverter produced at an output of the cycloconverter transitioning between positive and negative or between negative and positive, and bandpass filtering the instantaneous output current of the cycloconverter to produce a filtered signal to reduce current ripple and ensure that a fundamental frequency component of the filtered signal does not have any phase-shift relative to the instantaneous output current, and comparing the filtered signal to at least one reference level to determine whether the instantaneous output current transitioned from positive to negative or from negative to positive.

91. The method of claim 90 including enabling the one of the positive and negative banks being enabled only after the other of the positive and negative banks has been disabled and a true zero current condition occurs at the output of the cycloconverter.

92. The method of claim 91 including determining that the true current condition occurs when all of the naturally commutated switching devices are non-conducting.

93. The method of claim 92 including sensing the voltages across the naturally commutated switching devices and determining that all the naturally commutated switching devices are non-conducting when the voltages across all of the naturally commutated switching devices are above a predetermined level.

94. The method of claim 90 wherein the fundamental frequency is 60 Hz.

95. The method of claim 90 wherein the reference level includes first and second reference levels of +0.1A and −0.1A.

* * * * *

UNITED STATES PATENT AND TRADEMARK OFFICE
CERTIFICATE OF CORRECTION

PATENT NO. : 7,102,331 B2
APPLICATION NO. : 10/758609
DATED : September 5, 2006
INVENTOR(S) : Richard T. Walter et al.

It is certified that error appears in the above-identified patent and that said Letters Patent is hereby corrected as shown below:

Title Page,
Item [56] References Cited, U.S. PATENT DOCUMENTS, 6,507,506 B1,
"Pinas as et al" should be -- Pinas et al --.

Column 18,
Line 27, after "sensing that" insert -- that --.

Column 21,
Line 22, begin a new paragraph with "switching".

Signed and Sealed this

Twenty-first Day of August, 2007

JON W. DUDAS
*Director of the United States Patent and Trademark Office*